July 7, 1970     K. G. HELLER ET AL     3,519,823
ATTITUDE SIGNALLING SYSTEM INCLUDING A MIRROR WHICH
SCANS THE HORIZON OF A CELESTIAL BODY
Filed May 15, 1963

FIG. 1

INVENTORS
KENNETH G. HELLER
SHELDON A. KNIGHT
WILLIAM SNYDER

ATTORNEYS

INVENTORS
KENNETH G. HELLER
SHELDON A. KNIGHT
BY WILLIAM SNYDER

ATTORNEYS

INVENTORS
KENNETH G. HELLER
SHELDON A. KNIGHT
WILLIAM SNYDER
BY
ATTORNEYS

July 7, 1970   K. G. HELLER ET AL   3,519,823
ATTITUDE SIGNALLING SYSTEM INCLUDING A MIRROR WHICH
SCANS THE HORIZON OF A CELESTIAL BODY
Filed May 15, 1963   6 Sheets-Sheet 4

INVENTORS
KENNETH G. HELLER
SHELDON A. KNIGHT
BY  WILLIAM SNYDER

*Flehr and Swain*
ATTORNEYS

United States Patent Office 3,519,823
Patented July 7, 1970

3,519,823
ATTITUDE SIGNALLING SYSTEM INCLUDING A MIRROR WHICH SCANS THE HORIZON OF A CELESTIAL BODY
Kenneth G. Heller, Redwood City, Sheldon A. Knight, Mountain View, and William Snyder, Palo Alto, Calif., assignors, by mesne assignments, to TRW Inc., a corporation of Ohio
Filed May 15, 1963, Ser. No. 280,540
Int. Cl. G01c 3/08
U.S. Cl. 250—83.3                                6 Claims

ABSTRACT OF THE DISCLOSURE

An attitude sensor including an infrared telescope mounted for periodic oscillatory azimuthal scan of a sector of horizon of an object over which it is flying, as in a space vehicle. The line of sight of the telescope is oscillated in elevation simultaneously with the azimuthal oscillation. An electromagnetic servomechanism continuously orients the telescope so that it tracks the horizon during azimuthal scan. A block diagram is given of electrical circuitry for controlling the telescope scan and for processing the output signals derived from the telescope.

---

This invention relates generally to an attitude signalling system and method and more particularly to an attitude signalling system and method using periodic motion of a horizon scanner in both elevation and azimuth.

Attitude signalling systems are used in space vehicles to provide, in conjunction with the associated electronic circuits, information or signals regarding the attitude (angular relationship of the spacecraft body axis to a reference line in space) of space vehicles so that they may be oriented and guided in flight.

Attitude signalling systems which employ horizon scanners are known. For example, one type of system relies upon the continuous observation of a plurality of fixed points on the earth's infrared horizon to derive the attitude information. Disturbances in the earth's infrared horizon, such as cold clouds, temperature variation in the upper atmosphere, and infrared gradients on the earth's surface may introduce errors in the attitude information. Another type of system is one in which the earth's entire horizon is continuously tracked. This type of system requires relatively complex mechanical mounts to permit movement of the scanner through 360° to track the entire horizon while the space vehicle changes its attitude. This restricts the mounting position of the optical and mechanical elements to such an extent that the system can be used only for a few restricted applications.

It is a general object of the present invention to provide an improved attitude signalling system and method.

It is another object of the present invention to provide an attitude signalling system and method which includes a scanner which periodically scans a sector of the earth's horizon in elevation and azimuth.

It is still a further object of the present invention to provide an attitude signalling system and method including horizon sensing means which minimizes the effects of the horizon anomalies such as are introduced by cold clouds, infrared gradients at the earth's surface, temperature variations in the earth's atmosphere and the like.

It is another object of the present invention to provide an attitude signalling system including a horizon scanner which employs dual motion of the field of view of an infrared telescope.

It is still a further object of the present invention to provide an attitude signalling system and method including a horizon scanner which is adapted to search for the horizon to track the same and includes means for inhibiting processing of information during a portion of the horizon search period.

It is still a further object of the present invention to provide an attitude signalling system which employs a torsionally mounted horizon scanner which is impulsively driven.

It is still a further object of the present invention to provide an attitude signalling system including a horizon scanner in which the scanner moves periodically over a sector of the horizon with means for controlling the amplitude of the scan.

It is another object of the present invention to provide an attitude signalling system and method including a horizon scanner which has dual periodic motion of the field of view and which provides a signal representative of the instantaneous position of the scanner together with means for processing the information to give attitude signals.

Generally, the horizon scanner of the present invention scans the horizon azimuthally at a predetermined slow rate as the field of view is oscillated in elevation. A servo system continuously orients the scanner in elevation so that it tracks the horizon as the field of view is azimuthally scanned. Means are provided for deriving attitudue signals from the signals representative of the elevation of the field of view during different portions of the slow speed scan.

The foregoing and other objects of the invention will become more apparent from the folowing description when taken in conjunction with the accompanying drawings.

Referring to the drawing.

Figure 1:
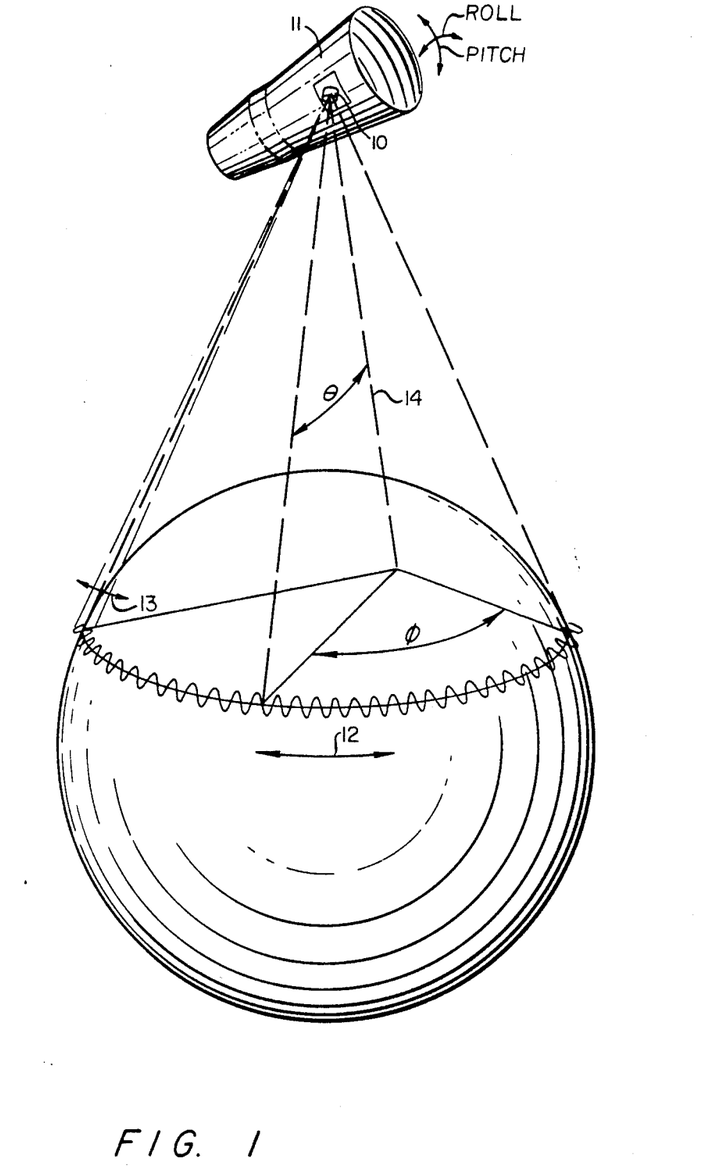
FIG. 1 schematically shows a space vehicle and the horizon sensor geometry.

Referring to FIG. 1, the attitude signalling system employs a dual motion scanner telescope mounted in a space vehicle 11. The telescope 10 scans back and forth along a sector of the earth's infrared horizon, as indicated by the arrow 12, to provide the azimuth scan. Concurrently, the telescope is oscillated or dithered, as indicated by the arrow 13, through a small angle in elevation at a higher frequency to provide an elevation scan. Thus, a portion of the horizon edge is tracked. An output elevation signal provides information regarding variations in the average elevation of the line of sight of the telescope as measured during the different portions of the azimuth scan. These signals are processed to derive the attitude information. Referring to the drawing, the azimuth scan is represented by the angle $\phi$, while the angle of elevation of the telescope with respect to the vehicle vertical axis (yaw axis) 14 is represented by the angle $\theta$. It is, of course, apparent that as the vehicle rolls and pitches, the elevation angle $\theta$ varies as the telescope scans through the angle $\phi$.

Referring now to FIGS. 2, 3, 4 and 5, there are shown the mechanical and optical parts of an attitude signalling system which provide means for scanning the earth's infrared horizon. A particular electro-optical-mechanical arrangement is described for causing a telescope to scan the earth's horizon. It will become apparent that other arrangements can be used for scanning the earth's horizon and providing elevation signals.

The arrangement illustrated includes a housing 21 which carries a bifurcated yoke 22 mounted to rotate about an axis which includes the upper and lower precision bearings 23 and 24. The yoke carries sub-assembly 27 which includes mirror 28 mounted to rotate about the axis 29 so that it can scan up and down over approximately a 35° sector producing 70° optical scan. In a space vehicle, flying between altitudes of 50 and 900 nautical miles, this permits in excess of 20° of tilt before losing the horizon. More deviation of attitude can be accommodated by modifying the mechanical parts. The sub-assembly 27 which mounts the mirror will be presently described in detail. The combined movements about the axis of the bearings and the axis 29 permits tracking of a relatively large sector of the earth's horizon as the space vehicle travels through space. Oscillatory azimuth motion, rotation about the axis including bearings 23 and 24, is established and maintained at a predetermined frequency as, for example, 1 cycle per second, by spring forces and the amplitude is supported by impulsive forces acting on the yoke. The spring action is provided by a torsion rod 31 acting in conjunction with the sheave 32 rigidly mounted thereon and the sheave 33 (FIGS. 2 and 4) mounted for rotation with the yoke together with the belt or drive means 34 interconnecting the two. Thus, the torsion rod will provide oscillator forces to cause the yoke to rotate about its axis.

Since frictional and drag forces will dampen the motion of the yoke to some extent, electromagnetic means are provided for maintaining the amplitude of oscillation. Such means includes spaced drive coils 41 (FIGS. 2 and 5) carried by the housing. The spaced drive coils accommodate an armature ring 43. The ring includes a portion of nonmagnetic material near the center and portions of magnetic material on each side of the center. When either coil is energized, it tends to center the respective portion of magnetic material. This applies torque to the yoke in the appropriate direction. The coils are periodically energized by electrical impulses of sufficient energy to maintain the amplitude of oscillation of the yoke.

Figure 2:
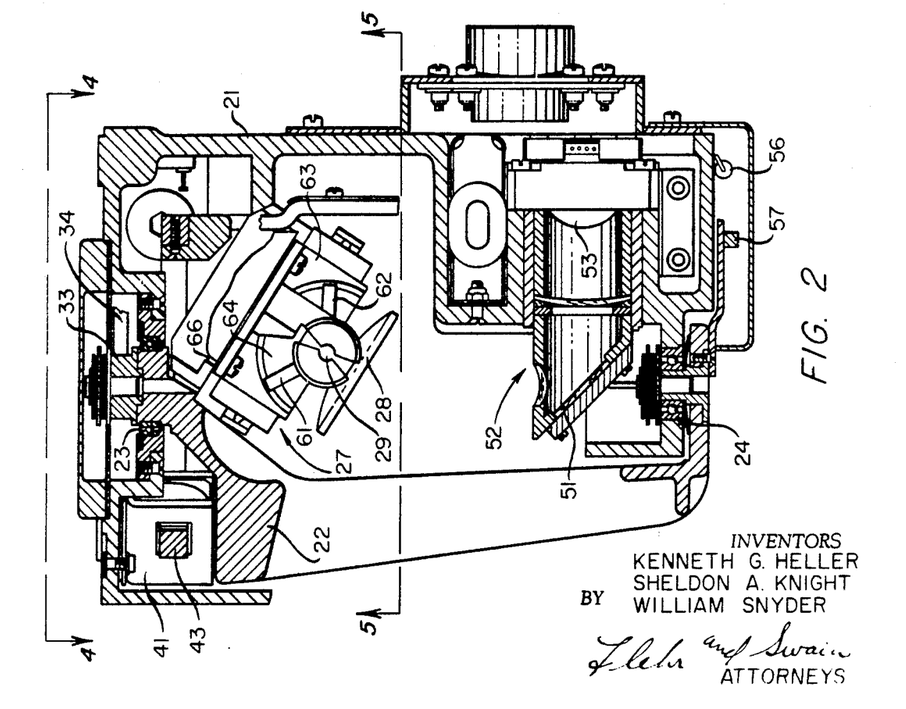
FIG. 2 is an elevational view in section showing the mechanical and optical portions of the attitude signalling system.
Figure 3:
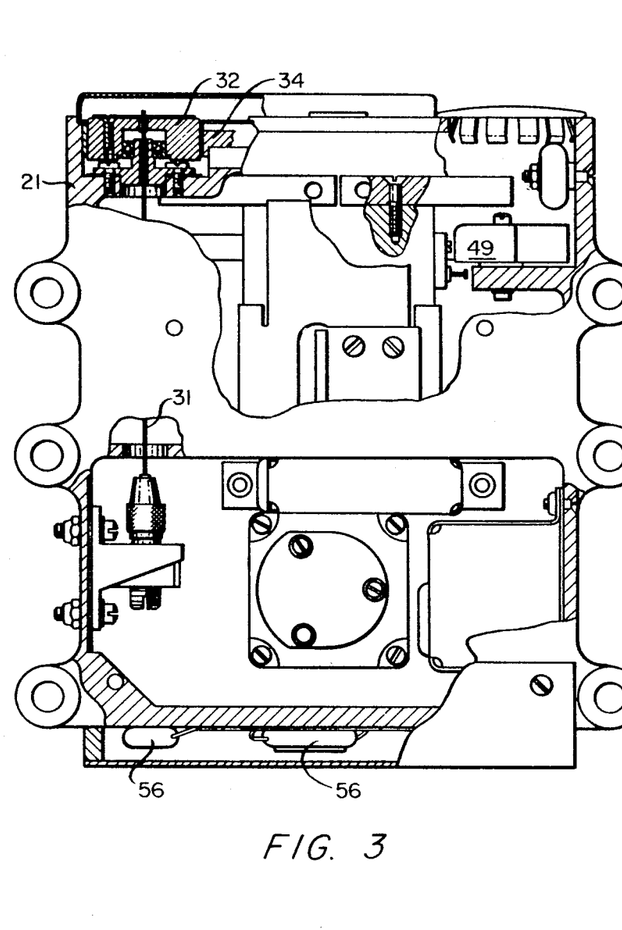
FIG. 3 is a back view, partially broken away, to show internal parts of the mechanical and optical portions of the system of FIG. 2.
Figure 4:
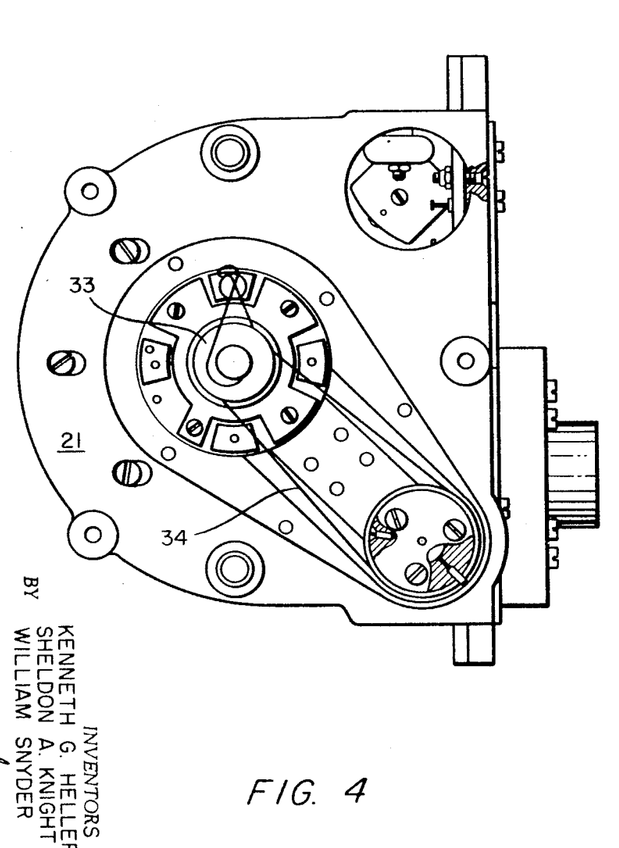
FIG. 4 is a top view with parts broken away to show internal parts, taken generally along the line 4—4 of FIG. 2.
Figure 5:
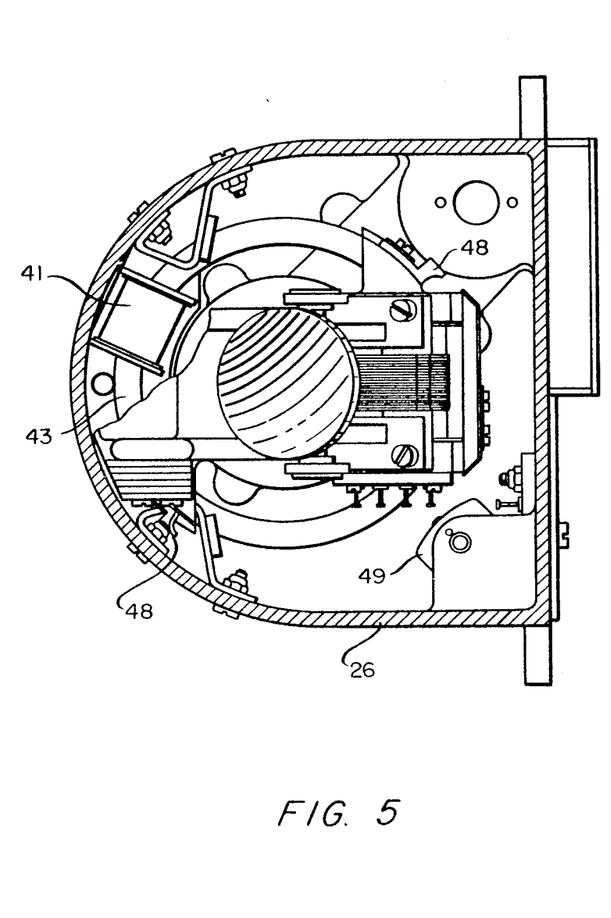
FIG. 5 is a sectional view taken generally along the line 5—5 of FIG. 2.

The amplitude of the yoke oscillations should be kept constant. For this purpose, there are provided spaced tabs 48 of magnetic material carried by the yoke and adapted to close the magnetic circuit in a magnetic head 49 as the yoke oscillates between limits. The change in reluctance of the magnetic head is employed, as will be presently described, to control the amplitude of the energy pulses applied to the drive coils whereby the energy supplied is sufficient to compensate for the frictional and drag forces and maintain amplitude of oscillation constant.

There has been described a particular "motor" for driving the yoke and maintaining the amplitude of oscillation. Other "motors" employing electromotive forces rather than torsional forces may also be employed. In its broadest aspects, the present invention is intended to encompass such alternative means.

The energy received from the earth's surface by the mirror 28, as it scans in elevation and azimuth, is reflected to the flat mirror 51 of the telescope assembly 52 and, in turn, is focused on an infrared detector 53, such as a bolometer. The output of detector 53 is then employed, as will be presently described, to control, in a servo system, the position of the mirror whereby the telescope tracks or views the earth's horizon.

A plurality of magnetically activated switches 56 are mounted on the frame and are activated by the magnet 57 mounted for movement with the yoke 22. Activation of these switches provides timing signals for use in the signal processing circuitry to be presently described.

The means for positioning the mirror to view the horizon is illustrated in FIGS. 2 and 5. The mirror is mounted on the rotor of a permanent magnet type torquer. The rotor includes a pair of mirror drive coils 61 and 62 which move in the air gap defined by the laminated pole pieces 63 and 64. The laminated pole pieces are magnetically coupled to a permanent magnet 66 and form together therewith a base. The rotor is supported on the base for rotation about the axis 29 by flat springs which are arranged to flex for rotation of the rotor. Electrical connection is made to the coils through the flexure pivots.

When direct current is applied to the drive coils, the rotor will assume an angular position which is proportional to the current. As will be presently described, an alternating current component may also be applied to the drive coils to cause the same to dither or oscillate about a normal position whereby the mirror scans a small angle above and below the horizon (elevational scan) to provide an input signal for the position servo which applies the direct current to the coils to position the rotor and mirror.

An elevation signal representative of mirror position or elevation can be derived by modulating the magnetic field at a given higher frequency than the dither frequency and deriving an output signal by inducing a voltage proportional to position in a coil coupled to the modulated field.

The magnetic field may, for example, be modulated by applying alternating current at the higher frequency to the drive coils. The magnetic field generated by this current passing through the drive coils will modulate the constant magnetic field. Pick-up coils 67 are coupled to the field and the position signal can be recovered by suitable filtering. The amplitude of the position signal will be proportional to the degree of coupling of the drive coils to the magnetic structure and this, in turn, is dependent upon the angular position or elevation of the mirror. Thus, the amplitude of the elevation signal at the pick-up coils 67 is indicative of position or elevaiton of the mirror. The elevation signal can also be derived by using the coils 67 to modulate the magnetic field and using the drive coils to couple to the field and generate the signal. The amount of flux coupled will again be dependent upon the position of the drive coils.

Figure 6:
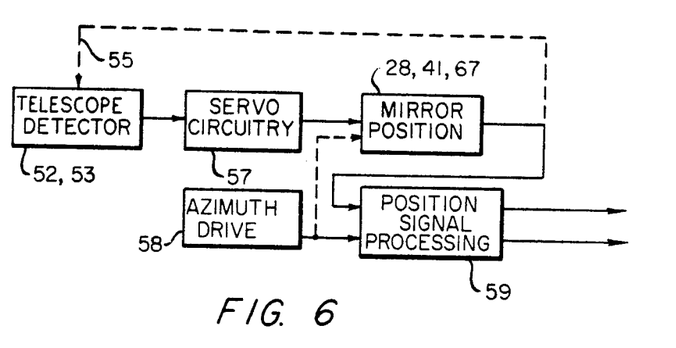
FIG. 6 is a block diagram of an electrical circuit for driving the mechanical parts and processing the signals.

Referring to FIG. 6, there is shown a schematic block diagram of the attitude signalling system. The system includes the mirror 51 and the infrared detector 53. The detector 53 provides an output signal to the servo circuit 57 which provides drive signals for driving the mirror 28 so that it tracks the earth's infrared horizon as the yoke azimuthally scans. The servo loop is optically closed as indicated by broken line 55 by the radiation from the earth's surface. There is also shown the azimuth drive 58 for providing the driving impulses to the azimuth drive coils 41. The signal processing circuits 59 receive elevation signals representative of mirror position from pickup coils 67 as well as signals from the azimuth drive and derive pitch and roll output signals.

Figure 7:
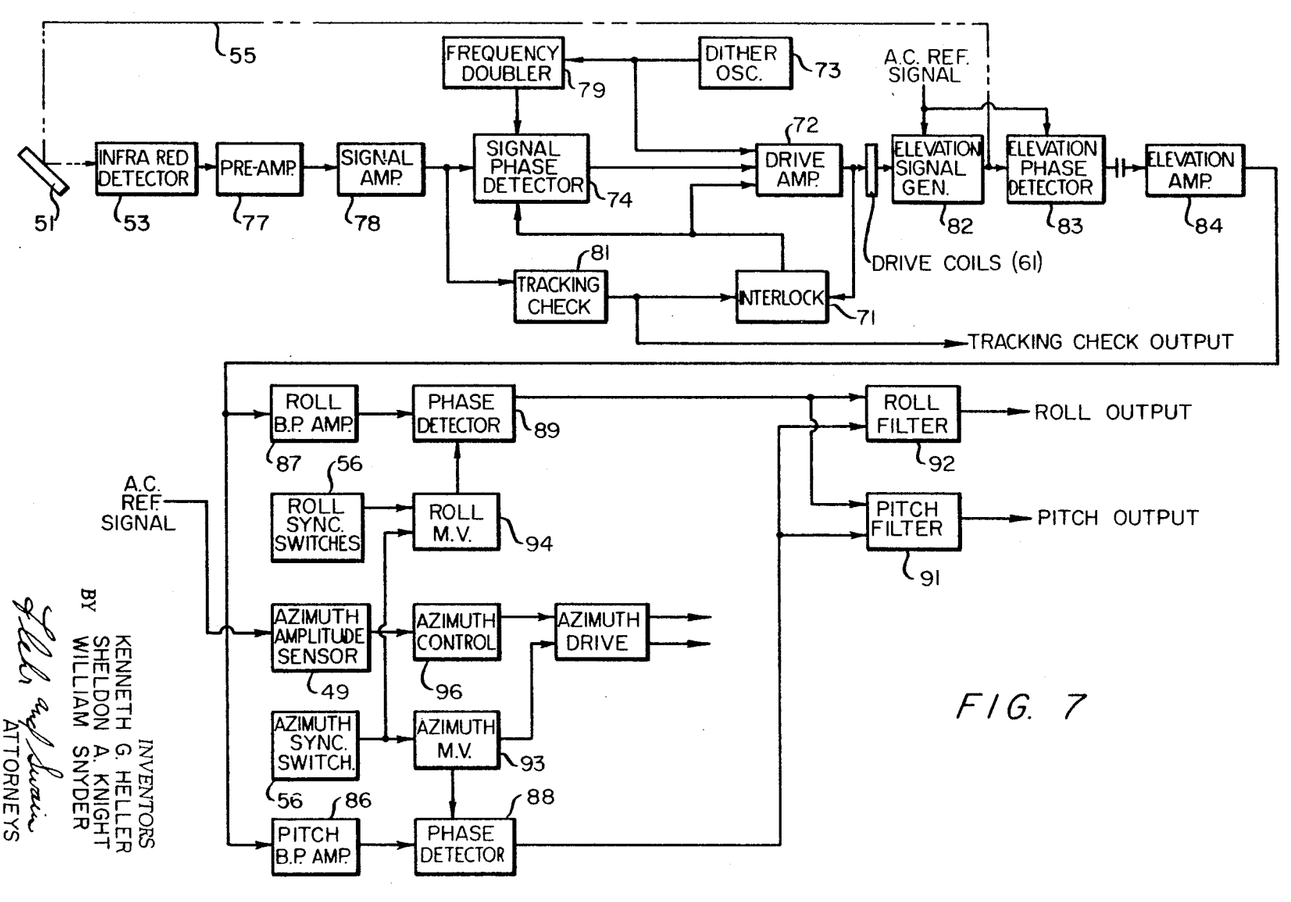
FIG. 7 is a more detailed block diagram of the eletcrical circuits for driving the mechanical parts and processing the signals.

Referring to FIG. 7, there is shown a more detailed block diagram of the electrical circuits for controlling the motion of the mirror and yoke and for deriving the attiutde signals. Basically, the electronics may be divided into four sections: the tracking servo whose function it is to cause the mirror to search and track the earth's infrared horizon; the signal processing electronics whose function it is to take a signal proportional to the time variation in the mirror angle and convert it to pitch and roll output; the azimuth drive circuitry which controls the amplitude of the oscilltaions of the yoke to control the azimuth scan; and the power supply (not shown) for energizing the other circuitry.

The horizon tracking servo consists of the upper section of FIG. 7. The tracking servo operates in one of two modes depending upon whether or not the horizon is being tracked. When the horizon is not being tracked, a triangular search waveform is applied to the mirror drive coils 61, 62 by the drive amplifier 72 which receives its input from the tracking interlock circuit 71. The interlock circuit 71 is controlled or triggered by the output from the drive amplifier 72. Essentially, the interlock includes a bistable circuit which is switched from one state to the other in response to positive and negative voltages of predetermined amplitude. The drive amplifier 72 integrates the output of the interlock and provides linearly increasing and decreasing drive voltages for causing the mirror to move repeatedly through its full 35° range of elevational movement at a predetermined rate, for example, one cycle per second. As the output of the amplifier reaches the predetermined switching voltages, the interlock switches to provide an output signal of opposite polarity whereby there is repetitive elevational movement. At the same time, a dither signal is also applied to the mirror drive coils from the dither oscillator 73 to cause the mirror to oscillate or dither about the position established by the drive signal. When the field of view of the mirror crosses the horizon as it moves from viewing space to viewing the earth (as it scans downwardly in elevaiton), the signal applied to the signal phase detector 74 from the infrared detector 53 through the preamplifier 77 and signal amplifier 78 will be an alternating voltage whose frequency corresponds to the dither frequency. The signal is phase detected by detector 74 which has applied theerto a reference phase from a frequency doubler 79 connected to the dither oscillator. The output of the phase detector is applied to the drive amplifier. The signal is of sufficient amplitude to override the search signal and the mirror changes automatically from the search to the track mode of scanning.

In order to prevent locking onto infrared gradients on the earth's surface, the interlock 71 applies its signal to the signal hase detector which includes means for inhibiting operation of the phase detector as the telescope is scanning from earth to space. Thus, the interlock is responsive to the drive amplifier output to control the application of signal to the signal phase detector. At the extreme space end, the signal channel is turned on and stays on during the downward sweep until it locks onto the first gradient encountered or the mirror reaches the earth end of its downward sweep. If no gradient is encountered, the signal channel is turned off at the earth end of the mirror sweep and remains off until turned on again at the space end of the sweep. The interlock action, therefore, ensures that lock-on will take place on the first gradient encountered when the mirror (line of sight) moves in elevation from space to earth.

Figure 8:
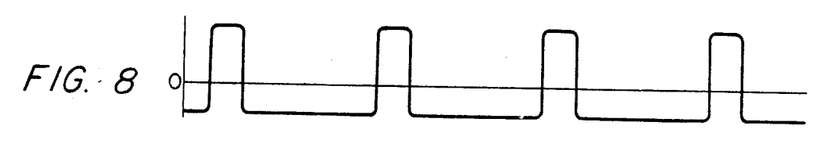
FIG. 8 shows the infrared detector output when the horizon is below dither scan center.
Figure 9:
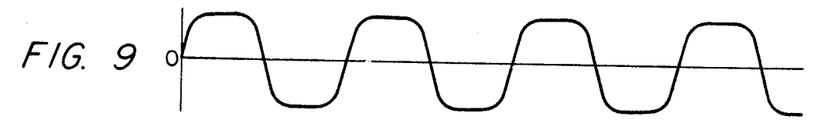
FIG. 9 shows the infrared detector output when the horizon is at dither center.
Figure 10:
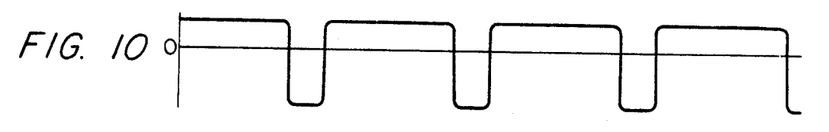
FIG. 10 shows the infrared detector output when the horizon is above dither center.
Figure 12:
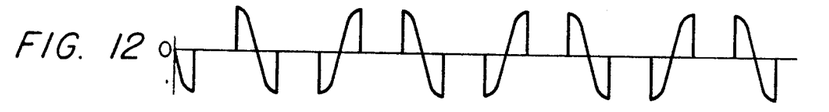
FIG. 12 shows the output of the phase detector which receives the infrared detector output when the horizon is at dither center.
Figure 13:
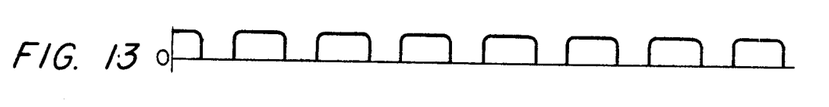
FIG. 13 shows the output of the phase detector which receives the infrared detector output when the horizon is above dither center.

The following discussion of the signal waveforms which appear at various points in the servo circuit will make the operation of the servo circuit apparent. The amplified voltage waveform from the infrared detector is shown in FIGS. 8, 9 and 10 for three tracking positions of the mirror, the line of sight slightly above center of the horizon, on horizon center and slightly below center of the horizon, respectively. The signal phase detector is a half-wave detector referenced to the second harmonic of the dither frequency. A typical dither frequency is 30 cycles. The output of the position phase detector is shown in FIGS. 11, 12 and 13, respectively, for the three positions of the mirror elevations of the line of sight.

Figure 11:
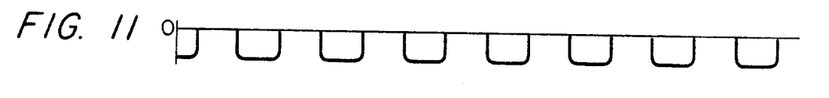
FIG. 11 shows the output voltage waveform from the phase detector which receives the infrared detector output when the horizon is below the dither center.

It can be seen that for the position in which the line of sight dither center is above the horizon, the output is that shown in FIG. 8, and there is a negative D-C component in the output of the signal phase detector, FIG. 11. For the case in which the line of sight dither center is below the horizon, the output is shown in FIG. 10, and there is a positive D-C component in the output of the signal phase detector, FIG. 13. When the horizon is on the mirror dither center, the output is shown in FIG. 9, and the D-C component in the phase detector output is zero. The D-C components in the signal phase detector output are applied through the drive amplifier 72 to correct the mirror position so that it always tracks the horizon.

The signal level at the output of the signal amplifier 78 is monitored by the tracking check circuit. If the signal falls below a preset level, corresponding to the lowest signals that would be produced when tracking the earth, the tracking check circuit 81 switches the interlock to turn off the signal channel and switch the servo system into the search mode, previously described.

The tracking check 81 can also be operated to give an indication if the signal amplifier output exceeds a preset threshold at any time in the azimuth scan. This condition would indicate that the sun is within the line of sight of the mirror and, therefore, might produce a slight disturbance in the attitude output. The disturbances produced by the sun in this type of sensor are small because if the sun is more than the dither angle from the horizon, it will never appear in the system's field of view.

The signal amplifier 78 may be designed to have nearly instantaneous recovery from overload conditions. Since azimuth is being continuously scanned and the sun is viewed only over a very short time of the total azimuth scan, there is thus an averaging effect. Furthermore, since the signal used to develop the pitch and roll information, as will be presently described, is not the infrared detector signal but rather the elevation signal which represents the mirror angle information, there will be negligible disturbance in the final outputs due to the fast transients in the signal channel.

As previously described, an excitation signal is applied to either the reference coils 67 of the mirror positioning system or to the drive coil 62. In the first instance, the output is then obtained from the drive coils, whereas in the second, the output signal is obtained from the reference coils. In any event, the elevation signal will have an amplitude and phase which is dependent upon the mirror position during the azimuth scan. The elevation signal from the elevation signal generator means 82 (drive coils and reference coils), which represents the mirror elevational angle, is applied to the phase detector 83 which has the excitation signal applied thereto as a reference. The output of the phase detector 83 is a slow varying D-C signal. This signal is amplified to a position amplifier 84 which is A-C coupled to the phase detector whereby only the time varying portions of the wave are amplified. The time variations will correspond to variations in the angle between the line of sight of the mirror and a reference direction such as the angle θ, FIG. 1, as the mirror is scanned azimuthally over the horizon. These amplified time variations are then processed in the signal electronics to produce pitch and roll output signals.

Figure 14:
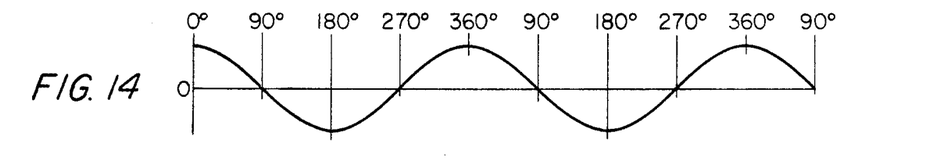
FIG. 14 shows the azimuth scan angle as a function of time.

Referring to FIG. 14, there is shown a curve of the azimuth scan angle as a function of time. The axis of abscissa is marked in terms of degrees in which 360° includes a to and fro azimuth scan regardless of the portion of the earth's horizon which is scanned. Thus, at the zero position, the mirror is at standstill and begins to gain velocity until the 90° scan point where it is travelling at its maximum velocity. It is then decelerated to the 180° point, reverses its direction, is accelerated to the 270° scan point and declerated to the 360° or starting point. The mirror moves up and down to track in elevation the earth's horizon as the line of sight is azimuthly scanned.

Figure 15:
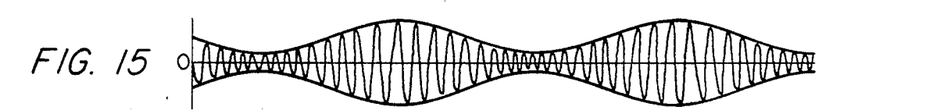
FIG. 15 shows the elevation output signal when the front end of the vehicle is pitched downwardly.
Figure 16:
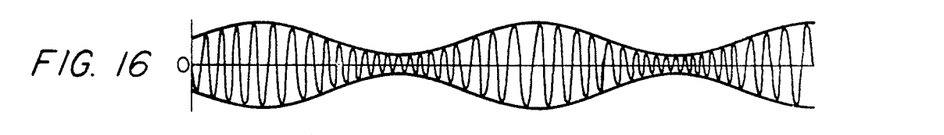
FIG. 16 shows the elevation output signal when the front end of the vehicle is pitched upwardly.
Figure 17:
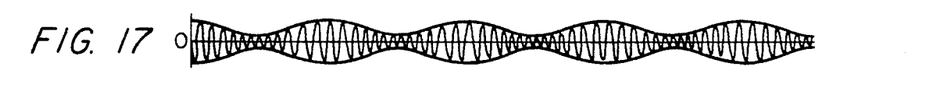
FIG. 17 shows the elevation output signal when the side of the space vehicle on which the scanner is mounted is rolled toward the horizon.
Figure 18:
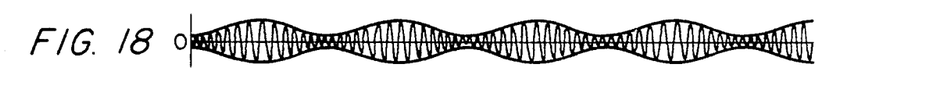
FIG. 18 shows the elevation output signal when the side of the space vehicle on which the scanner is mounted is rolled away from the horizon.

FIG. 15 shows the elevation signal and envelope of the elevation signal output for pure pitch upward for a space vehicle having the scanning mechanism mounted for movement as shown in FIG. 1. In FIG. 16, there is shown the output for pure pitch downward. It is to be noted that these two signals are 180° out of phase, one with respect to the other. It is further noted that the position signal envelopes have a frequency equal to the scanning frequency. In FIGS. 17 and 18, there are shown the elevation signal outputs for pure roll. FIG 17 shows pure roll of the vehicle in a direction to bring the scanning mechanism closer to earth, and FIG. 18 shows pure roll in a direction to bring the scanner away from the earth. Here, it is observed that the elevation signal envelopes have a frequency which is equal to twice the scan frequency, double that of the frequency of the pure pitch elevation signal output. The phases of the elevation signal envelopes for roll of the vehicle in the direction that the sensor is mounted and roll in the opposite direction are 180° out of phase.

The waveforms which are shown can be derived intuitively. For the case of pure roll, the elevation signal will be at maximum or minimum as the azimuth scan passes the 0° point, and least at the ends of the azimuth scan. The phase is dependent on the direction of roll. For pure pitch, the elevation signal will be greatest at the ends of the azimuth scan toward which the respective end of the vehicle is directed downwardly, and least at the other end of the scan.

The foregoing explanation of derived signals is for an electro-optical-mechanical arrangement mounted on the side of the vehicle. If the arrangement is turned 90° with respect to the described position as, for example, by mounting on the front or back of the vehicle, the roll elevation signal will be at the fundamental frequency and the pitch elevational signal frequency will be double.

Of course, the elevation signals derived in practice will contain both the pitch and roll components and their respective phases. The two components will be in the form of a fundamental (pitch) and a second harmonic (roll). Thus, the actual signal will be some combination of the elevation signals represented in FIGS. 15–18. The envelopes of these signals are representative of the detected output signal which will appear at the input to amplifier 84.

Figure 19:
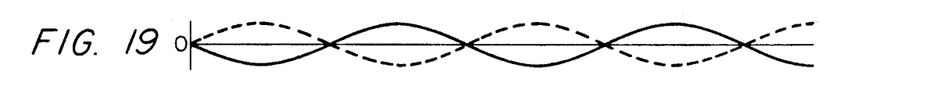
FIG. 19 shows the output from the detector which receives the elevation output signals of FIGS. 15 and 16.
Figure 20:
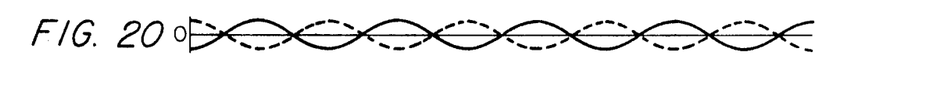
FIG. 20 shows the output of the phase detector which receives the elevation output signals of FIGS. 18 and 19.
Figure 21:
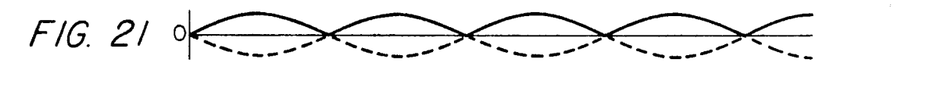
FIG. 21 shows the output from the phase detector which receives the signals of FIG. 19.
Figure 22:
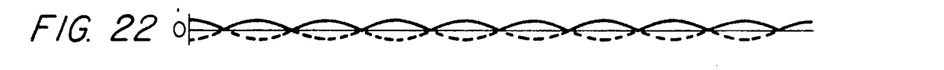
FIG. 22 shows the output of the phase detector which receives the signals of FIG. 20.

The two elevation signals, pitch and roll, are recovered by passing the demodulated signal from the position amplifier through band pass amplifiers 86 and 87, one tuned to the fundamental and the other tuned to the second harmonic. The output of these amplifiers is shown at FIGS. 19 and 20. The solid lines correspond to the pitch elevation signal shown in FIG. 15 and the roll elevation signal shown in FIG. 17. The dotted lines correspond to the pitch and roll elevation signals shown in FIGS. 16 and 18, respectively. The amplified signals are applied to the phase detectors 88 and 89 which produce outputs corresponding to those shown in FIGS. 21 and 22 for pitch and roll, rsepectively. The solid and dotted curves have the same meaning as above.

Figure 23:
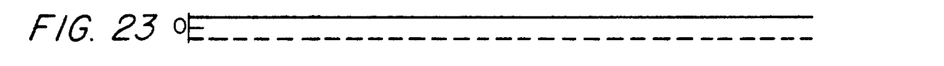
FIG. 23 shows the signal of FIG. 21 after filtering.
Figure 24:
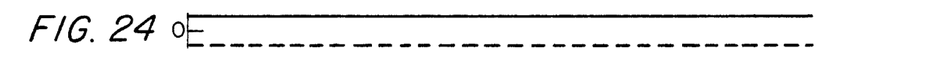
FIG. 24 shows the signal of FIG. 22 after filtering.

The output from the phase detectors 88 and 89 is applied to both the filters 91 and 92 which produce the D-C pitch and roll output signals. Each of the filters may include a resistor matrix to provide linear mixing to compensate for errors due to interaction of the pitch and roll signals or for non-alignment of the system axis with respect to the axis of the spacecraft. The output from the filters 91 and 92 is shown at FIGS. 23 and 24. The solid lines represent one direction of pitch and roll, and the dotted lines the other. The magnitude of the D-C signal is representative of the amplitude of pitch and roll.

The references for the pitch and roll phase detectors 88 and 89 are derived from two multivibrators 93 and 94. The azimuth multivibrator 93 serves the dual function of timing the azimuth drive and providing a reference for the pitch phase detector. The roll multivibrator furnishes the reference for the roll phase detector. Both multivibrators are synchronized to the azimuth scan by the magnetic switches 56, previously described. A small permanent magnet mounted on the reciprocating yoke produces an output pulse from the azimuth sync switch as the azimuth angle passes 90° and two roll sync switches produce output pulses as the yoke passes two other predetermined points which are equally spaced timewise between the center and end of travel. Since the azimuth motion is sinusoidal, these points are passed at equal time intervals during the scan.

The azimuth multivibrator is set to free run at a frequency slightly below the desired azimuth scan frequency. Each state change of this multivibrator produces a torque impulse, clockwise (CW) or counter-clockwise (CCW), in the azimuth drive coil of an amount set by the azimuth control 96. As soon as a slight oscillation is established in the azimuth scan, the azimuth sync switch will start closing as the azimuth angle passes exactly 90°, thus causing the azimuth multivibrator to fall in precise synchronism with the natural frequency of oscillation of the yoke scan head, spring mass system. Resonant oscillations build up. When the amplitude of the azimuth oscillation builds up to the desired amplitude, the small tabs 48 on the yoke start passing the magnetic head 49. The reluctance change in the magnetic head acts in the azimuth control to reduce the amplitude or energy of the torque impulses. Thus, the system will reach a steady state oscillation.

Thus, there is provided an attitude signalling system and method in which a scanner is periodically moved in azimuth as it tracks the earth's horizon in elevation. Elevation signals representative of the line of sight of the infrared telescope viewing the earth's horizon are derived and processed to obtain pitch and roll information. The mechanism is simple in construction because it is required to track only a portion of the earth's horizon. The electronics circuits required are likewise relatively simple because of the nature of the signals derived and the manner of processing the same to obtain the attitude signals. The attitude signalling system is capable of functioning over a wide attitude range. The necessity for scanning periodically only a portion of the earth's horizon provides flexibility in mounting on various space vehicles.

We claim:

1. In an attitude signalling system for a vehicle travelling in space with respect to a celestial body, a housing for mounting in the space vehicle, a frame member mounted in the housing for movement about a first axis, a mirror assembly mounted in the frame member for movement about a second axis perpendicular to the first axis, means providing an oscillatory scanning motion to the frame member and the mirror carried thereby about said first named axis, means for receiving light reflected by the mirror assembly, means connected to the means for receiving light for moving the mirror assembly about said second axis to cause the mirror assembly to view a portion of the surface of the body which includes the horizon and to cause the mirror assembly to track the horizon of the body during oscillatory scanning motion of the mirror assembly, said movement of said mirror assembly about the first and second axes being conjoint and related so that the mirror assembly follows an arcuate path corresponding to the horizon, said means for positioning the mirror assembly including means for applying oscillatory motion to the mirror assembly about said second axis to cause the mirror assembly to scan above and below the horizon during the time it follows the arcuate path whereby the irregularities in the horizon are averaged out, means for detecting the position of the mirror assembly and providing an output signal, and processing means for receiving the output signal to provide pitch and roll information of the space vehicle on which the attitude signalling sensing system is mounted.

2. An attitude signalling system as in claim 1 wherein said means for providing oscillatory scanning motion to the frame member and the mirror assembly carried thereby about said first named axis includes a torsion member, means for supplying oscillatory forces to the torsion member, and additional means for maintaining the amplitude of oscillation of the torsion member.

3. An attitude signalling system as in claim 2 wherein said additional means for maintaining the oscillatory motion of the torsion rod includes first and second coils with one of said coils affixed with respect to said housing and the other of said coils being mounted on said frame member for movement therewith and means for applying electrical impulses to said coils in synchronism with the oscillatory motion of the torsion member.

4. An attitude signalling system as in claim 5 together with means for controlling the amplitude of the electrical impulses supplied to the coils to maintain the amplitude of oscillation of the torsion member substantially constant.

5. An attitude signalling system as in claim 1 wherein said means providing an oscillatory scanning motion to the frame member and the mirror carried thereby includes spring means, electromagnetic drive means, means for applying electrical impulses to said electromagnetic drive means at a predetermined frequency in synchronism with the oscillatory motion of the frame member and wherein said means connected to the means for receiving light for moving the mirror assembly includes means for generating an elevation signal having fundamental and harmonic components representative of the line of sight of the mirror assembly as it scans the horizon, means for generating synchronizing pulses in response to movement of the said housing, first and second generating means for generating alternating electrical signals in response to said synchronizing pulses, said first generating means generating pulses at said predetermined frequency and said second generating means generating pulses at a harmonic of said predetermined frequency, first and second phase detectors, means connecting the first phase detector to the first generating means so that it receives signals from the first generating means, means connecting the second phase detector to the second generating means so that it receives signals from the second generating means, and means connecting said first and second phase detectors to said means for generating an elevation signal so that said first and second phase detectors receive elevation signals therefrom, said first phase detector serving to provide an output signal having an amplitude and phase corresponding to the amplitude and phase of said fundamental component in said elevation signal and said second phase detector serving to provide an output signal having an amplitude and phase corresponding to the amplitude and phase of said harmonic component of said elevation signal.

6. An attitude signalling system as in claim 5 together with first and second filter means, means connecting said first filter means to the output of said first phase detector and said second filter means to the output of said second phase detector, each of said filter means serving to provide an output D-C signal having a polarity and phase corresponding to the output of the corresponding phase detector.

References Cited

UNITED STATES PATENTS

| 2,949,536 | 8/1960 | Langton. |
| 3,020,407 | 2/1962 | Merlen. |
| 3,162,764 | 12/1964 | Haviland _________ 250—83.3 |
| 3,180,587 | 4/1965 | Garner et al. ____ 244—3.18 XR |
| 3,201,591 | 8/1965 | Froelich ________ 250—203 XR |
| 3,237,010 | 2/1966 | Elliott et al. |

DAVID H. RUBIN, Primary Examiner

O. B. CHEW II, Assistant Examiner

U.S. Cl. X.R.

250—203